United States Patent Office 3,592,627
Patented July 13, 1971

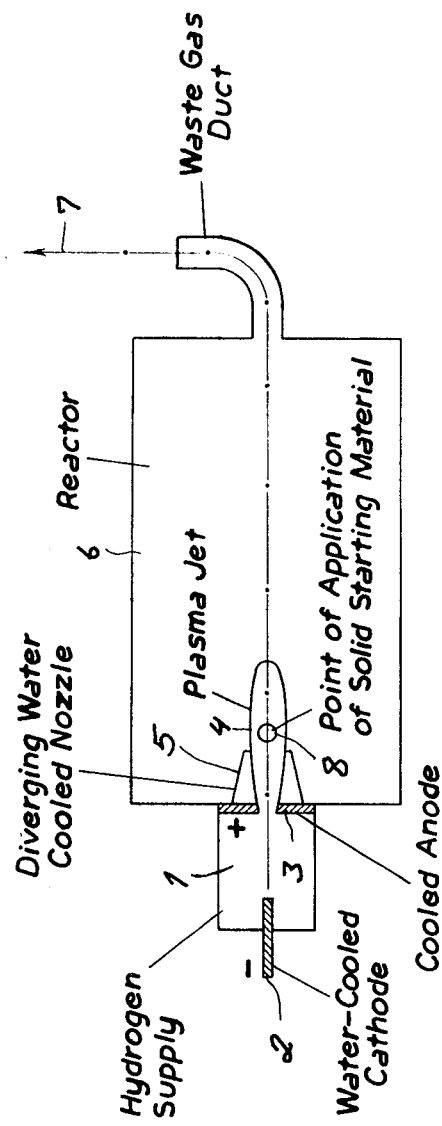

3,592,627
PRODUCTION OF PARTICULATE, NON-PYROPHORIC METALS
Ernst Neuenschwander, Basel, Switzerland, assignor to Hermann C. Starck Berlin, Berlin, Germany
Original application June 7, 1966, Ser. No. 555,859, now Patent No. 3,475,158, dated Oct. 28, 1969. Divided and this application Mar. 20, 1969, Ser. No. 832,518
Int. Cl. C22b 9/14; C22d 5/00; B22f 9/00
U.S. Cl. 75—.5BB                       1 Claim

ABSTRACT OF THE DISCLOSURE

Rhenium powder having an average particle size from 0.005 to 0.03 micron, an oxygen content not exceeding 3 mg. per square meter of surface, and is non-pyrophoric is disclosed.

---

This application is a division of application Ser. No. 555,859, filed June 7, 1966 and now Pat. No. 3,475,158.

In gas-discharge physics, the term plasma is used with reference to a partially or wholly ionized gas. If the plasma as a whole has a directional velocity, it is called a plasma flow or plasma jet. Such a plasma jet can be produced, for example, by blowing a gas through an electric arc. In this manner temperatures of 20,000° C., and even higher can be attained. The velocity may range from a few meters per second to a multiple of the speed of sound.

It is known that chemical reactions may be carried out in a plasma jet. In this way thermal decompositions, reductions with carbon or hydrogen, and halogenations have been performed; furthermore, a variety of nitrogen compounds has been prepared (see inter alia "The Plasma Jet," Scientific American 197 [1957] No. 2, p. 80 et seq. and "Industrial and Engineering Chemistry," volume 55, [1963] page 16 et seq.).

It is further known that the gas stream may consist of an inert gas or of a reactive gas. For example, when argon is used, a plasma jet is obtained which serves only as a source of heat; when on the other hand nitrogen or oxygen is used, the resulting gas is not only very hot but can under suitable conditions also be used for chemical reactions. When a carbon or graphite anode is used, reactions with carbon may be carried out in the plasma jet.

The present invention provides a process for the manufacture of finely dispersed, non-pyrophoric tungsten, molybdenum and rhenium, wherein a compound of such a metal which is free from carbon, finely comminuted and solid at the reaction temperature, is subjected at the action of a hydrogen plasma.

It is advantageous to use as non-volatile compounds those which contain no carbon and on reaction with hydrogen yield, in addition to the metal, readily volatile reaction products, such as water, hydrogen sulphide and ammonia. Preferred use is made of tungsten oxide, ammonium paratungstenate, polybdenum oxide or molybdenum sulphide, or of rhenium oxide or ammonium perrhenate. The particle size of these starting materials should in general be below 10 microns.

It is advantageous to use for every molecular proportion of the starting compound about 5 to 30 molecular proportions of hydrogen, whereby the individual metal is obtained in general in an average particle size from about 0.02 to 0.1$\mu$. The fact that metals in this particle size range are non-pyrophoric is surprising in view of the general experience. Using the definition in "Staub" 22 [1962] at page 495, the term pyrophoricity is here used to describe the spontaneous ignition, occurring in the absence of an extraneous igniter, of a small quantity of a powder in the solid state on contact with air at room temperature. The non-pyrophoric character is also attributable to the shape of the particles. As has been revealed by electron microscopic examinations, the present process furnishes predominantly particles having approximately the shape of cubes, octaheders or spheres. Thus, at the high reaction temperature, which is above the melting point of the metal formed, the resulting particles are not strongly fissured or porous, as is the case when the reaction is carried out at a low temperature. Accordingly, taking into consideration its particle size the metal powder has a minimal surface and this has been verified by the surface areas measured and computed from grain-size-distribution graphs. In addition, it is known that the pyrophoric character of a substance also depends on fault arrangements of the lattice which constitute an increased energy state. The high reaction temperature used in the process of this invention is extremely favorable in this respect too because each lattice faults can heal such more quickly than at a low temperature.

Another object of this invention is a rhenium powder obtained by the present process. It has an average particle size ranging from 0.005 to 0.03$\mu$, a form factor F of 1.0 to 1.5 and its oxygen content does not exceed 3 mg. per square meter of surface. The definition of the average particle size has been given above. The form factor F is defined as the ratio between the true surface of the particles (in actual practice measured according to a certain method) and the surface calculated from an assumed spherical shape of the particles; see W. Batel "Korngroossonmosstechnik," Editors Springer, 1960, page 14. The form factor was in the present case determined as follows: Some 1000 particles were measured and counted on electron microphotographs to enable the particle-size-distribution graph to be plotted as a first step. As the characteristic length of a particle the diameter of a circle whose projection had the identical area was chosen. Using as a basis spheres having these diameters the surface of the particle collective can then be calculated from the distribution graph. The form factor as defined above is then obtained from this value and from the valve resulting from the BET-measurement.

The use of metals having an average particle size below 1$\mu$ is of special importance to powder-metallurgical processes, either as matrix metal in dispersion consolidation, or for the manufacture of alloys whose constituents have widely different melting points, or for sintering operations at lower temperature. Fine refractory metals are also of importance to the reactor technique and to the catalysts.

The non-pyrophoric character of the metals obtained is very advantageous to their handling and further processing.

The present process is also distinguished by high yields which, as a rule, are better than 90%.

In a further stage of the present process the resulting, very finely pulverulent and very voluminous metal is subjected to an after-treatment to reduce its volume and to free it from contaminants (oxygen, sulphur, or nitrogen). In this after-treatment the powder is first rotated for several hours, whereby its bulk volume is reduced to about one fifth. The powder is then calcined under a vacuum from $10^{-1}$ to $10^{-4}$ at a temperature at which the particles do not yet grow, preferably at a temperature from 600 to 750° C. If desired, the after-treatment may alternatively be carried out without applying a vacuum but in the presence of hydrogen. Contrary to expectation, the powder so treated is still non-pyrophoric. Oxidation in air proceeds only slowly, which is another feature that considerably facilitates the handling of the fine material.

In general, the present process is performed thus: The solid compound is fed through a vertically disposed metal tube to the plasma jet entering the reactor in the horizontal direction, the said metal tube being vibrated by means of a vibrator; in this manner the formation of large agglomerates is prevented. Outside the reactor the metal tube flares out in funnel shape to make it easy for it to accept the finely powdered starting material running in through a sieve. For this purpose it is advantageous to use argon or hydrogen as carrier gas.

The reaction time and the temperature inside the plasma jet depend on the reaction conditions chosen and vary from $10^{-2}$ to $10^{-4}$ seconds and from 2000 to 5000° C. respectively.

The plasma jet is produced with the aid of a high-ampere electric arc in a so-called plasma generator which is advantageously of the known design and comprises a water-cooled hollow copper anode and a cooled tungsten cathode. To facilitate the mixing of the above-mentioned, relatively large amount of pulverulent starting material with the hydrogen plasma jet, the jet is widened in a diverging nozzle following upon the burner. By widening the plasma jet good mixing and as a result a complete reaction are achieved within the short time of residence. By letting the mixing of the reactants take place well away from any wall of the apparatus, any agglomerations of the metal formed on the apparatus and above all on the burner can be counteracted. Such agglomerations would rapidly clog the burner, specially when high concentrations are used, so that the process could not be performed continuously. It is another advantage of the performance of the reaction that the large quantities reacted inside the flame do not impair the stability of the electric arc.

The sole figure of the accompanying drawing is a diagrammatic representation of a plasma jet generator in side elevation, where 1 is the supply of hydrogen which, as a rule, flows in at right angles to the axis of the plasma jet at a rate which can be varied within wide limits; 2 is the water-cooled cathode which is advantageously made variable for its position; 3 is the cooled anode; 4 represents the plasma jet produced; 5 is the diverging, water-cooled nozzle; 6 is the reactor and 7 the waste gas duct which is taken through settling vessels to remove as much dust as possible; 8 is the point where the solid starting material is supplied.

As a rule, the metal is formed in the plasma jet under atmospheric pressure, but if desired reduced pressure may be used.

EXAMPLE

Manufacture of finely dispersed tungsten from $WO_3$

The plasma generator is operated under the following conditions:

Current intensity: 200 amperes
Arc voltage: 120 volts
Hydrogen throughput per minute: 74 standard liters (at 0° C. under 760 mm. Hg pressure)

At the exit opening of the diverging nozzle the plasma jet has a mean velocity of about 180 m./second and a mean temperature of about 3200° C. At 1 cm. from the exit opening of the diverging nozzle 90 g. of solid, finely powdered $WO_3$ are injected through a vibrating copper tube of 6 mm. inside diameter into the hydrogen jet. The reaction mixture forms a brilliant jet of 20 cm. length.

Per minute 70 g. of tungsten, corresponding to a yield of 98% of the theoretical, are obtained.

The cooling water supply to the reactor is then reduced so as to attain a temperature of 80° C. on the internal wall of the reactor. This prevents the water of reaction condensing inside the reactor.

The tungsten powder obtained in the reactor has a bulk weight of about 1 g./cc. and still contains 1% of oxygen. By calcining 500 g. each at 700° C. in a weak current of hydrogen (50 liters per hour) the oxygen content is further reduced to 0.6% without the grains growing.

The specific surface measured by the BET method was found to be 4.9 m.$^2$/gram, compared with a surface of 3.9 m.$^2$/gram of the oxide used as starting material. Thus, the present process makes it possible to reduce a tungsten compound not only without increasing its particle size but in fact while further diminishing it.

The form factor F determined by the method described above is 1.5.

In a similar manner tungsten was prepared from ammonium para-tungstenate (APW), molybdenum from $MoO_3$ and rhenium from $Re_2O_7$. The following table lists the results of the tests:

| Metal | Reaction conditions | Throughput per minute | Yield, percent | Calcin. temp., ° C. | Oxygen, percent | Spec. surface, m.$^2$/g. | Particle size (share in $\mu$)$_2$ | | | | | Form factor F |
|---|---|---|---|---|---|---|---|---|---|---|---|---|
| | | | | | | | 5% | 25% | 50% | 75% | 95% | |
| W | A | 50 g. APW | 98 | 700 | 0.6 | 5.5 | 0.015 | 0.025 | 0.035 | 0.05 | 0.08 | 1.3 |
| Mo | A | 50 g. MoO$_3$ | 98 | 700 | 0.6 | 6.4 | 0.02 | 0.03 | 0.05 | 0.07 | 0.13 | 1.4 |
| Re | B | 25 g. Re$_2$O$_7$ | 95 | 550 | 0.2 | 19.4 | 0.003 | 0.006 | 0.009 | 0.013 | 0.025 | 1.4 |

Reaction conditions: A=200 amperes, 120 volts, 74 standard litres of H$_2$ per minute; B=115 amperes, 98 volts, 24 standard litres of H$_2$ per minute.

What is claimed is:
1. Finely dispersed, non-pyrophoric rhenium powder, having an average particle size from 0.005 to 0.03$\mu$, a form factor F. from 1.0 to 1.5 and an oxygen content not exceeding 3 mg. per square meter of surface.

References Cited

UNITED STATES PATENTS 3,062,638  11/1962  Culbertson et al. _____ 75—0.5
3,211,548  10/1965  Scheller et al. _____ 75—84
3,341,320   9/1967  Smiley _____ 75—0.5

L. DEWAYNE RUTLEDGE, Primary Examiner

W. W. STALLARD, Assistant Examiner

U.S. Cl. X.R.
75—10, 84